Figures 1, 2:
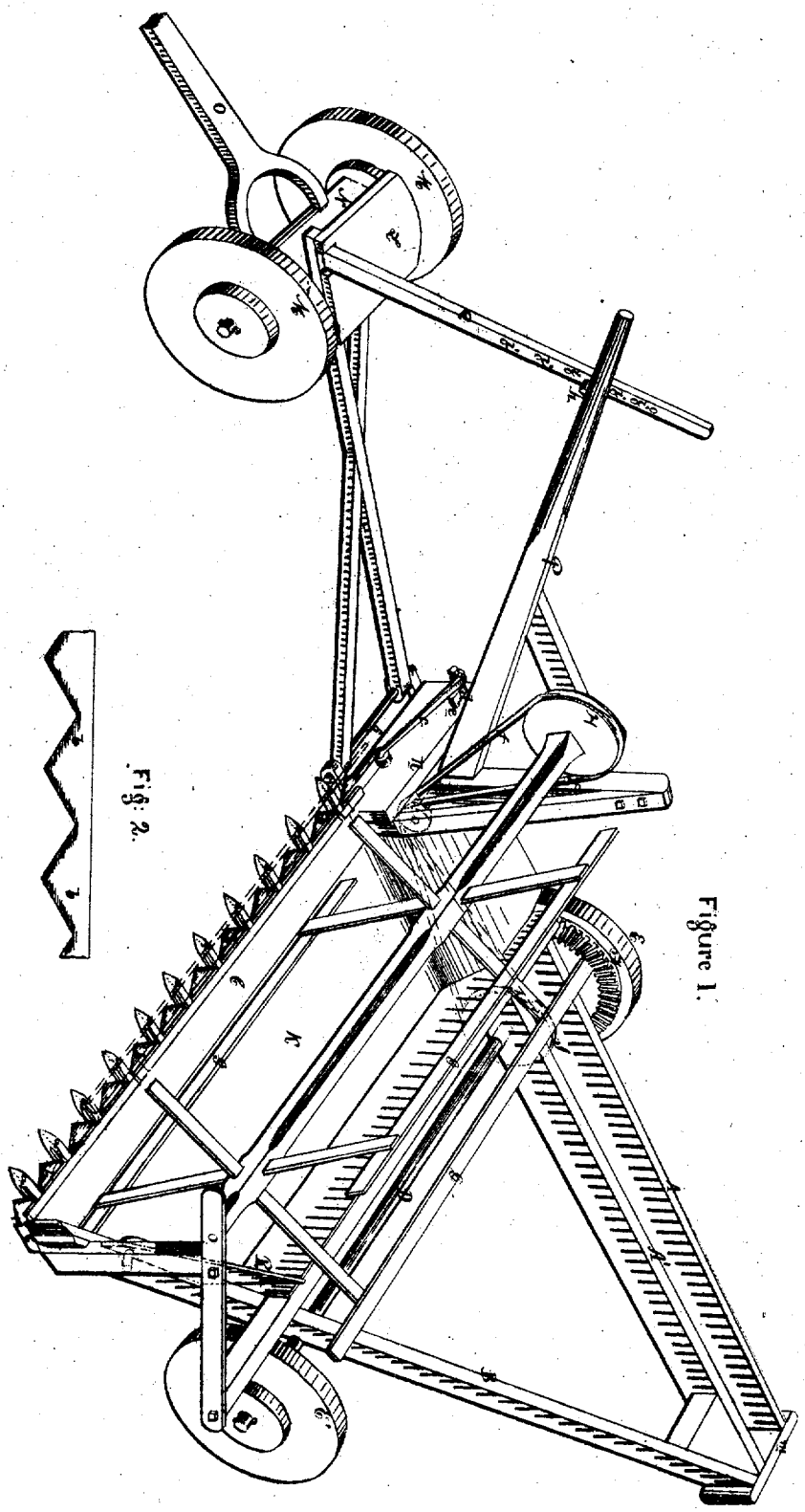

J. H. Manny,
Mower.

No. 290 Reissued Jan. 2. 1855.

UNITED STATES PATENT OFFICE.

JOHN H. MANNY, OF ROCKFORD, ILLINOIS.

IMPROVEMENT IN THE FRAME-CONSTRUCTION OF TRIANGULAR HARVESTERS.

Specification forming part of Letters Patent No. 8,385, dated September 23, 1851; Reissue No. 290, dated January 2, 1855.

DIVISION E.

*To all whom it may concern:*

Be it known that I, JOHN H. MANNY, of Rockford, in the county of Winnebago and State of Illinois, formerly of Waddam's Grove, in the county of Stephenson and State aforesaid, have invented certain new and useful Improvements in Reaping and Mowing Machines, of which the following is a full, clear, and exact description, reference being had to the accompanying drawing, which forms part of this specification, and in which—

Figure 1 represents a view in perspective of my machine complete.

In cutting grain or grass by means of machines it has been found by experience that the margin of that which was left uncut was always much broken down in consequence of being borne over by the dividing-finger and the outer end of the platform. This breaking down of the grain, it was discovered, took place when it was not bent over at a greater angle from the perpendicular than that to which it might be bent without depriving it of the power to right itself again, provided the deflection was sudden and its release from the deflecting agent immediate. The permanent set or lodgment of grass or grain from this cause was therefore plainly due to its being held in an inclined or deflected position for a considerable time. In the case of grass-cutting a remedy for the difficulty was found in dispensing with a wheel or other support for the finger-bar that involved a frame at the outer end and simply supporting it on a shoe. This remedied the breaking down of the margin of the uncut gass, but it created other difficulties of as great if not greater magnitude. Among these it destroyed the proper balance of machines whose organization required that their center of gravity should be back of the finger-bar. It further involved the construction of a bulky and heavy finger-bar, in order to give it the necessary strength when left without the support of a frame. A still further and more serious difficulty arose from dispensing with a wheel to support the outer end of the finger-bar, and that was the increased friction at that point, which tended to turn the machine horizontally upon the driving-wheel as a pivot, producing a heavy lateral strain against the horses, tending to press them toward the standing grain or grass, and materially increas- the draft of the machine. In the case of grain-cutting, however, the platform could not be dispensed with, as the grain has to be carried forward as it is cut until enough has been accumulated to form a sheaf, when it is discharged upon the ground, so that the breaking down of the margin of the uncut grain by the reaper has heretofore been unmitigated. In addition to this serious difficulty, a second of scarcely less importance has resulted from the proximity of the outer end of the platform to the standing grain, which rendered it necessary to place the supporting-wheel, which must be at the outside of the platform in a very confined space, which does not allow sufficient room for the stubble and earth that adheres to the tire of the wheel while running over damp ground to be discharged freely; and the result is that by rubbing against the frame as the wheel turns earth stubble, and weeds become so firmly compacted upon the tire, fellies, and spokes that at length the wheel is completely clogged and has to be dragged instead of rolled. This both increases the draft and augments the side pressure of the tongue against the horses.

My invention and improvement, which is designed to overcome all these difficulties, consists in making the frame which supports the cutter and platform triangular or trapezoidal, with one side of the triangle or trapezium arranged parallel to the cutter or finger bar and one of its acute angles at the end of the finger-bar next the standing grain, so that the frame may not at the outer end bear against the standing grain farther back than the finger-bar, thus securing all the advantages of the mowing-machine, in which the bar is unsupported by a frame or wheel, in combination with all the advantages of a supporting-frame. While this frame, from its peculiar form, leaves sufficient space at the outer end to place the supporting-wheel far enough from it to be free from all danger of clogging, at the same time it will not run too near the uncut grain; and still further, what is of the first importance, the supporting-wheel thus arranged will not be too far back to balance the machine properly.

The machine represented in the accompanying drawings, to which my improvements are applied, consists of two principal parts connected together by a hinged draft-bar. The first is a two-wheeled truck or leading carriage, to which the horses are harnessed, and which carries the driver. The second is also a two-wheeled carriage, and it supports the cutter and gearing. This cutter-carriage consists of a pair of parallel side rails, A A′, connected by transverse bars *m* and *n*. These together constitute the frame which supports the driving-wheel and driving-gear. From the inner rail A′ the bar C, which supports the cutter and the fingers, projects at right angles, and its outer extremity is held up by the end of the lever B, extending across to the rear end of the gear-frame and resting between its extremities upon an axle, D, on which the supporting-wheels E E′ turn. From this arrangement it will be seen that the outer end of the finger-bar is supported on the outer end of the lever B. This end of the lever, with the weight of the bar supported thereon, is counterbalanced and held up by the weight of the frame, to which its inner end is attached. As the gear-frame and the lever are both rigid and turn upon the axle as their common fulcrum, it follows that when by the raising of the front end of the gear-frame the inner end of the finger-bar and cutter is raised the rear end of the gear-frame and the rear end of the lever B will be depressed proportionately, and will raise in a corresponding degree the outer end of the finger-bar, so as to maintain it at the same elevation under all circumstances as the inner end, so far as rigidity in the frame can accomplish that object.

The front bar, C, of the frame sustains the cutting apparatus. This consists of a series of stationary fingers, *a a*, which project forward, and as the machine is advanced enter the standing grain, and of a reciprocating sickle-blade, *b*. The latter is serrated, as represented in the drawing, and its edges are sickled. The sickle is connected at one extremity by means of a rod, *c*, with the wrist of a crank, *d*, which is secured to the front extremity of the shaft *e*. This shaft extends backward toward the axle D, and carries at its hinder extremity a beveled pinion, whose teeth engage with those of a corresponding beveled wheel, F, secured to one of the running-wheels E, so that the latter becomes the driving-wheel of the machine, and in running over the ground causes the crank-shaft to revolve and impart a reciprocating movement to the sickle-blade.

To facilitate the operation of the cutting apparatus, a reel, G, is employed to press the grass or grain toward the cutters and turn it over the bar upon the ground or a platform, as the case may be. The shaft of this reel turns upon bearings in the frame of the machine. It is fitted with a belt-pulley, H, which is encircled by a belt leading from a corresponding pulley, I, on the axle D, so that as the latter turns with the wheel E the reel is caused to revolve.

When the machine is arranged for cutting grain and is in operation the grain cut falls upon a platform, K, behind the cutting apparatus, and is raked off at the side of the machine by a person who stands upon the frame behind the platform.

In order to leave the side of the platform at which the grain is discharged perfectly free for the action of the raker, the belt *f*, by which motion is conveyed to the reel-shaft, is deflected from its direct course between the driving and leading pulleys I and H by passing it under guide-pulleys, which are pivoted to the frame of the machine beneath the front edge of the raking-platform.

The leading carriage, to which the team is harnessed, consists of a pair of wheels, M, an axle, N, a stand, L, for the driver, a tongue, hounds, &c., to harness the horses to, and a standard for aiding in maintaining the cutter at the proper height. This leading carriage is connected with the rear or cutter carriage by means of a draft-bar, which is connected to the leading carriage by a king-bolt in the same manner that a perch is usually connected to the front axle of a wagon. This permits the axle-tree and draft-bar to turn freely. The hinder extremity of the draft-bar, which in this example is forked, is connected by a horizontal bolt, *g*, with the finger-bar on the hinder carriage, so that this carriage can tilt or turn upon the axle D of its running-wheels without affecting the front axle-tree, N, to which the tongue O is secured. In order to control the tipping of the hinder carriage, and consequently to regulate the distance of its front rail and the cutting apparatus thereto attached from the ground, a strong bar or arm, P, projects from the frame of the hinder carriage over the frame of the front one and moves up and down by the side of a standard, Q, erected upon the front part of the driving-platform on the forward carriage. The bar P may be held against the standard Q by a rectangular staple which embraces the standard. This standard is perforated with a series of holes, *i*, to which a pin, *h*, is fitted, that can be shifted from one hole to another. The projecting bar P is rigidly connected with the front part of the hinder-carriage frame, and hence when it is raised this portion of the carriage is correspondingly raised and the cutting apparatus is lifted from the ground. It is then prevented from lowering down again by passing the pin *h* through the standard in the hole immediately beneath the bar P. This pin, although it prevents the bar P, and consequently the front of the hinder carriage, from sinking too low, does not prevent it from rising when the finger-bar strikes an unobserved protuberance on the ground, and hence, while this arrangement affords a convenient means for regulating the distance of the cutting apparatus from the ground, it diminishes the risk of the breakage from a collision with an unnoticed bowlder or other hard protuberance on the surface of the ground.

When this machine is used for cutting grain the driver stands upon the platform L of the front carriage, where he can drive the horses, observe the height of the grain, the nature of the surface of the ground, the position of obstructions, and can at the same time regulate the height of the cutter by raising or lowering the bar P, and with it the cutting apparatus, as circumstances may require. The raker stands upon the frame of the hinder carriage, behind the raking-platform K, where he can readily rake off the grain falling thereon and discharge it at the side of the machine most distant from the standing grain.

When the machine is used for mowing grass or other substances which do not require to be bound into sheaves the platform is removed and the cut grass falls directly over the finger-bar and cutter upon the surface of the ground behind it, and is left in the track or wake of the machine. As the cut grass falling at that side of the machine nearer the standing grass would be in the way of the team and wheels when making a succeeding cut, and would also be injured by being trampled, I secure an adjustable hinged guard-plate, R, to the inner side of the oblique lever B. When the raking-platform K is in use this guard-plate is turned up, as is represented in Fig. 1; but when the platform is removed this guard-plate is depressed and then turns, the cut grass falling at that end of the cutting apparatus away from the standing grass, thus leaving a clear space for the wheels to run on and the team to walk in while making a succeeding cut.

What I claim as my invention, and desire to secure by Letters Patent, is—

Constructing the frame which supports the cutting apparatus of a triangular or trapezoidal form, one of its acute angles being at the end of the finger-bar next the standing grain, so that the frame will not bear against the standing grain back of the finger-bar, and will permit the wheel which supports the outer end of the platform to be placed a considerable distance within the end of the finger-bar, yet sufficiently far from the frame, and at the same time not too far back of the center of weight to poise or balance the machine properly.

In testimony whereof I have hereunto subscribed my name.

JOHN H. MANNY.

Witnesses:
P. H. WATSON,
F. G. DE FONTAINE.